(12) United States Patent
Zhou et al.

(10) Patent No.: US 11,987,163 B2
(45) Date of Patent: May 21, 2024

(54) SAFETY CONTROL TAKE-UP FASTENING APPLIANCE

(71) Applicant: Taizhou Runjie Logistics Safety Equipment Technology Co., Ltd., Taizhou (CN)

(72) Inventors: Jing Zhou, Taizhou (CN); Fengquan Ma, Taizhou (CN); Chunzhi Li, Taizhou (CN); Xianwei Yang, Taizhou (CN)

(*) Notice: Subject to any disclaimer, the term of this patent is extended or adjusted under 35 U.S.C. 154(b) by 599 days.

(21) Appl. No.: 17/275,206

(22) PCT Filed: Dec. 20, 2019

(86) PCT No.: PCT/CN2019/127068
§ 371 (c)(1),
(2) Date: Mar. 11, 2021

(87) PCT Pub. No.: WO2021/120185
PCT Pub. Date: Jun. 24, 2021

(65) Prior Publication Data
US 2022/0111783 A1    Apr. 14, 2022

(30) Foreign Application Priority Data
Dec. 16, 2019  (CN) .......................... 201911295240.8

(51) Int. Cl.
*B60P 7/08*    (2006.01)
*B65H 75/44*    (2006.01)

(52) U.S. Cl.
CPC ............. *B60P 7/0846* (2013.01); *B60P 7/083* (2013.01); *B65H 75/4444* (2013.01)

(58) Field of Classification Search
CPC ..... B60P 7/0846; B60P 7/083; B65H 75/4444
(Continued)

(56) References Cited

U.S. PATENT DOCUMENTS 7,503,736 B1 *    3/2009   Chen ....................... B60P 7/083
                                                          410/100
8,312,601 B2 *   11/2012   Huang .................... B60P 7/083
                                                          254/218

(Continued)

FOREIGN PATENT DOCUMENTS

CN    1843653 A  * 10/2006   ............. B60P 7/083
CN    2936490 Y  *  8/2007

(Continued)

*Primary Examiner* — Hilary L Gutman

(57) ABSTRACT

A safety control take-up fastening appliance, comprising a base; the base is composed of a base bottom plate and base side plates; the front of the base is provided with a long webbing, a front cover, a movable pendulum block and a guide shaft; the middle is provided with ratchets, a connecting sleeve and a volute spring; the rear is provided with a first pawl, a handle and a short webbing. The invention can be used in the field of multiple types of logistics, which can effectively provide restraints for articles or goods and ensure stable transportation. The safety is far higher than that of the old-fashioned fastening appliance, which can effectively prevent the rapid retraction of the webbing from causing accidental injury to surrounding personnel or objects. At the same time, the connector can be loaded through the appliance connecting hole for easy installation and use.

10 Claims, 10 Drawing Sheets

(58) Field of Classification Search
USPC .......................................................... 410/100
See application file for complete search history.

(56) References Cited

U.S. PATENT DOCUMENTS

| | | | |
|---|---|---|---|
| 2009/0047091 A1* | 2/2009 | Huck | B60P 7/083 24/68 CD |
| 2016/0347233 A1 | 12/2016 | Kingery | |
| 2017/0120797 A1* | 5/2017 | Zhou | B60P 7/083 |
| 2019/0366905 A1* | 12/2019 | Persson | A61G 3/0808 |
| 2021/0170937 A1* | 6/2021 | Chen | B60P 7/083 |
| 2022/0142307 A1* | 5/2022 | Seader | A44B 11/065 |
| 2022/0176865 A1* | 6/2022 | Mazzarelli | B60P 7/083 |
| 2022/0203881 A1* | 6/2022 | Hatcher | B60P 7/083 |
| 2023/0103711 A1* | 4/2023 | Kolletre | B65B 13/22 24/71 TD |
| 2023/0173974 A1* | 6/2023 | Mazzarelli | B60P 7/083 24/70 ST |
| 2023/0346082 A1* | 11/2023 | Seader | B60P 7/083 |
| 2023/0373380 A1* | 11/2023 | Hatcher | B60P 7/083 |

FOREIGN PATENT DOCUMENTS

| | | | |
|---|---|---|---|
| CN | 201646536 U | * | 11/2010 |
| CN | 102205880 A | | 10/2011 |
| CN | 105235933 A | | 1/2016 |
| CN | 107200152 A | | 9/2017 |
| CN | 208746313 U | | 4/2019 |
| CN | 209506174 U | | 10/2019 |
| CN | 110422362 A | | 11/2019 |
| CN | 110435956 A | | 11/2019 |

\* cited by examiner

SAFETY CONTROL TAKE-UP FASTENING APPLIANCE

BACKGROUND OF THE INVENTION

1. Field of the Invention

The invention relates to the technical field of fastening appliances, in particular to a safety control take-up fastening appliance.

2. Description of the Related Art

A fastening appliance is an appliance that binds articles or goods, and also becomes a tensioner, which provides a fixing function for goods during transportation, movement, shipment or storage.

Conventional fastening appliances of this kind often do not have automatic winding function, and a small number of fastening appliances have winding function. However, the winding speed is often uncontrollable, which leads to rapid winding of the webbing, causes accidental injury to surrounding personnel and objects, and the safety is not ideal.

SUMMARY OF THE INVENTION

In view of the above problems, the invention proposes a safety control take-up fastening appliance.

The specific technical solutions are as follows:

A safety control take-up fastening appliance, comprising a base, wherein the base is composed of a base bottom plate and base side plates; the base bottom plate and the base side plates are an integrated structure; the base side plates are perpendicular to the base bottom plate and symmetrically located on both sides of the base bottom plate; the front of the base is provided with a long webbing, a front cover, a movable pendulum block and a guide shaft; the middle of the base is provided with ratchets, a connecting sleeve and a volute spring; the rear of the base is provided with a first pawl, a handle and a short webbing;

the front side of the base side plate is provided with symmetrical riveting holes, pendulum block connecting holes and guide connecting holes; the front cover fits with the front of the base, is sleeved on the front of the base, and is riveted to the base through the riveting holes; the front cover is provided with a first through hole; the movable pendulum block is composed of connecting plates and a pendulum block, and the connecting plates are symmetrically arranged on both sides of the pendulum block; the pendulum block connecting hole is provided with a pendulum block rotating shaft; the pendulum block rotating shaft is in interference clamping with the pendulum block connecting hole, and penetrates the connecting plate; the connecting plate is in clearance fit and rotation connection with the pendulum block rotating shaft; the pendulum block rotates freely with the pendulum block rotating shaft as the central axis; the pendulum block is provided with a second through hole; the guide shaft is placed at the guide connecting hole and is in interference clamping with the guide connecting hole;

the middle of the base side plate is provided with symmetrical ratchet connecting holes; the number of the ratchets is two, and the middle thereof is provided with a clamping hole; the cross section of the connecting sleeve is C-shaped, and both ends thereof are provided with clamping teeth; the two ratchets are clamped and connected to the clamping teeth at both ends of the connecting sleeve through the clamping hole to realize the clamping and fixing of the ratchets and the connecting sleeve; the ratchet connecting hole is fixedly provided with a shaft sleeve, and the rotation of a ratchet rotating shaft and the base side plate is realized through the shaft sleeve; the ratchet rotating shaft penetrates the middle of the ratchet, passes through the connecting sleeve, and is in interference clamping with the connecting sleeve; the connecting sleeve, the ratchet and the ratchet rotating shaft rotate synchronously; the volute spring is arranged on the outer surface of the base side plate; one end of the ratchet rotating shaft is provided with a bayonet, which protrudes from the base side plate and extends into the volute spring; the ratchet rotating shaft is clamped and connected to the volute spring through the bayonet;

one end of the long webbing is sleeved on the ratchet rotating shaft, drawn from the C-shaped opening of the connecting sleeve and wound on the connecting sleeve, and then passes through the guide shaft, the pendulum block rotating shaft, the second through hole and the first through hole in sequence; the other end of the long webbing is connected with end fittings, which are symmetrically located at the rear ends of the base side plates on both sides of the base bottom plate and are fixedly connected by a connecting rod; one end of the short webbing is sleeved on the connecting rod, and the other end thereof is connected to the end fitting;

the rear side of the base side plate is provided with first pawl sliding grooves; the rear side of the base bottom plate is provided with a first limiting plate; the first pawl sliding groove is provided with the first pawl; the first pawl is T-shaped, and both ends thereof are slidably arranged at the first pawl sliding groove, and the lower end thereof is sleeved with a first return spring, which is inserted into the first limiting plate and in slidable fit with the first limiting plate; under the action of the first return spring, the first pawl slides elastically in the direction of the first pawl sliding groove; the first pawl is matched with the ratchets correspondingly;

the handle is composed of a handle bottom plate and handle side plates; the handle bottom plate and the handle side plates are an integrated structure; the handle side plates are perpendicular to the handle bottom plate, and symmetrically located on both sides of the handle bottom plate; the handle side plate is sleeved on the ratchet rotating shaft and is rotatably connected to the ratchet rotating shaft, and freely rotates with the ratchet rotating shaft as the central axis; the handle side plate is provided with symmetrical second pawl sliding grooves; the handle bottom plate is provided with a second limiting plate; the second pawl sliding groove is provided with a second pawl; the second pawl is T-shaped, and both ends thereof are slidably arranged at the second pawl sliding groove, and the lower end thereof is sleeved with a second return spring, which is inserted into the second limiting plate, and in slidable fit with the second limiting plate; under the action of the second return spring, the second pawl slides elastically in the direction of the second pawl sliding groove; the second pawl is matched with the ratchets correspondingly.

In the safety control take-up fastening appliance, the two T-shaped ends of the second pawl extend out of the second pawl sliding groove, and fit with the upper arc surface of the base side plate under the action of the second return spring;

the upper arc surface is divided into a no-load section, a tightening section and a release section in sequence; a first locking notch is provided between the no-load section and the tightening section; a second locking notch is provided at the end of the release section;

the lower arc surface of the handle side plate is provided with a first pressing surface and a second pressing surface for pressing the first pawl.

In the safety control take-up fastening appliance, after one end of the long webbing sleeved on the ratchet rotating shaft is drawn from the C-shaped opening of the connecting sleeve and wound on the connecting sleeve, it first passes between the guide shaft and the base bottom plate, and passes between the pendulum block rotating shaft and the base bottom plate, then passes through the second through hole, and finally passes through the first through hole.

In the safety control take-up fastening appliance, after one end of the long webbing sleeved on the ratchet rotating shaft is drawn from the C-shaped opening of the connecting sleeve and wound on the connecting sleeve, it first passes between the guide shaft and the base bottom plate, and bypasses the side of the pendulum block rotating shaft away from the base bottom plate, then passes through the second through hole, and finally passes through the first through hole.

In the safety control take-up fastening appliance, the handle bottom plate is sleeved with a handle sleeve.

In the safety control take-up fastening appliance, the second pawl extends with a control board for dialing the second pawl; the outside of the control board is sleeved with a control sleeve.

In the safety control take-up fastening appliance, both the handle sleeve and the control sleeve are provided with anti-skid patterns.

In the safety control take-up fastening appliance, the end fittings are connectors for connection, including but not limited to hooks and locks.

In the safety control take-up fastening appliance, the base bottom plate is provided with an appliance connecting hole.

In the safety control take-up fastening appliance, the base side plate is provided with a brake component; the brake component is located on the opposite side of the volute spring and comprises an adjusting cap, a pressure spring and a brake disc; the adjusting cap is connected to the base side plate through screw threads, and is covered on one end of the ratchet rotating shaft; the pressure spring and the brake disc are arranged between the adjusting cap and the ratchet rotating shaft, and the brake disc is closely attached to one end of the ratchet rotating shaft; the two ends of the pressure spring are respectively pressed against the adjusting cap and the brake disc.

In the safety control take-up fastening appliance, the pressure spring is always in a compressed state.

The advantageous effects of the invention are:

The safety control take-up fastening appliance provided by the invention comprises a base, wherein the base is composed of a base bottom plate and base side plates; the front of the base is provided with a long webbing, a front cover, a movable pendulum block and a guide shaft; the middle of the base is provided with ratchets, a connecting sleeve and a volute spring; the rear of the base is provided with a first pawl, a handle and a short webbing. The invention can be used in the field of multiple types of logistics, which can effectively provide restraints for articles or goods and ensure stable transportation, and has stable structure and convenient operation. According to the winding structure of the webbing, it can be divided into automatic winding and semi-automatic winding. The safety is far higher than that of the old-fashioned fastening appliance, which can effectively prevent the rapid retraction of the webbing from causing accidental injury to surrounding personnel or objects, and play a safe control function. At the same time, the connector can be loaded through the appliance connecting hole for easy installation and use.

DETAILED DESCRIPTION OF THE PREFERRED EMBODIMENTS

Figure 1:
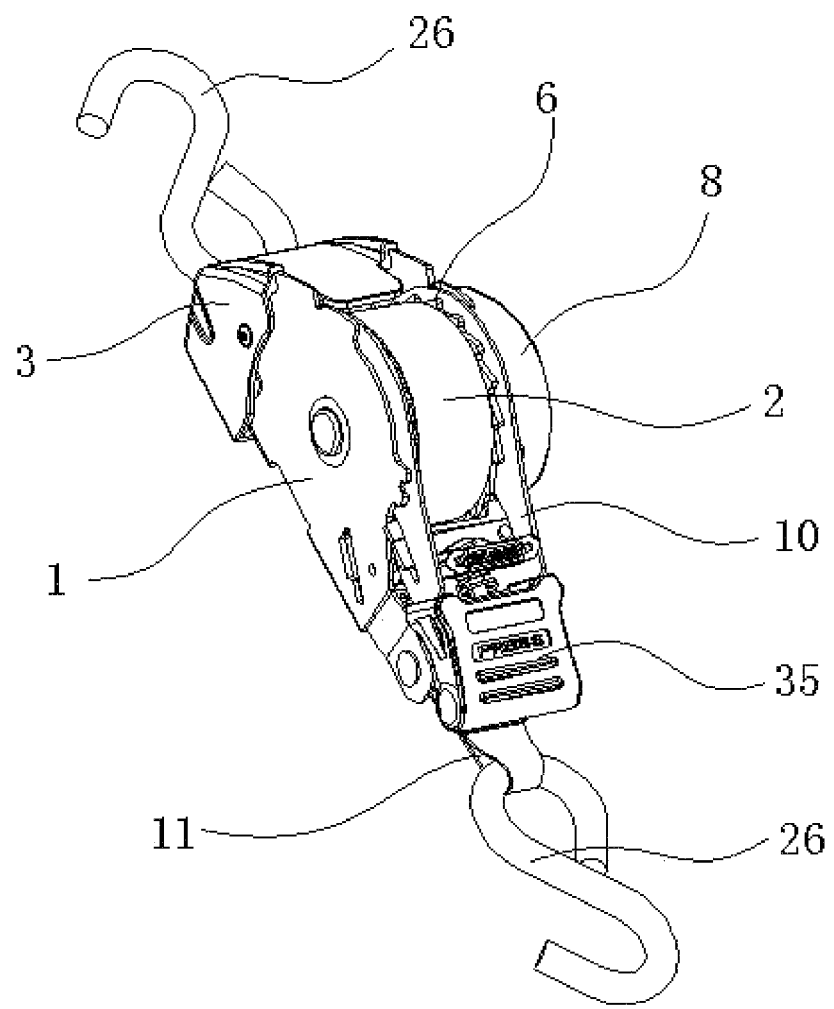
FIG. 1 is a schematic diagram of the invention.
Figure 2:
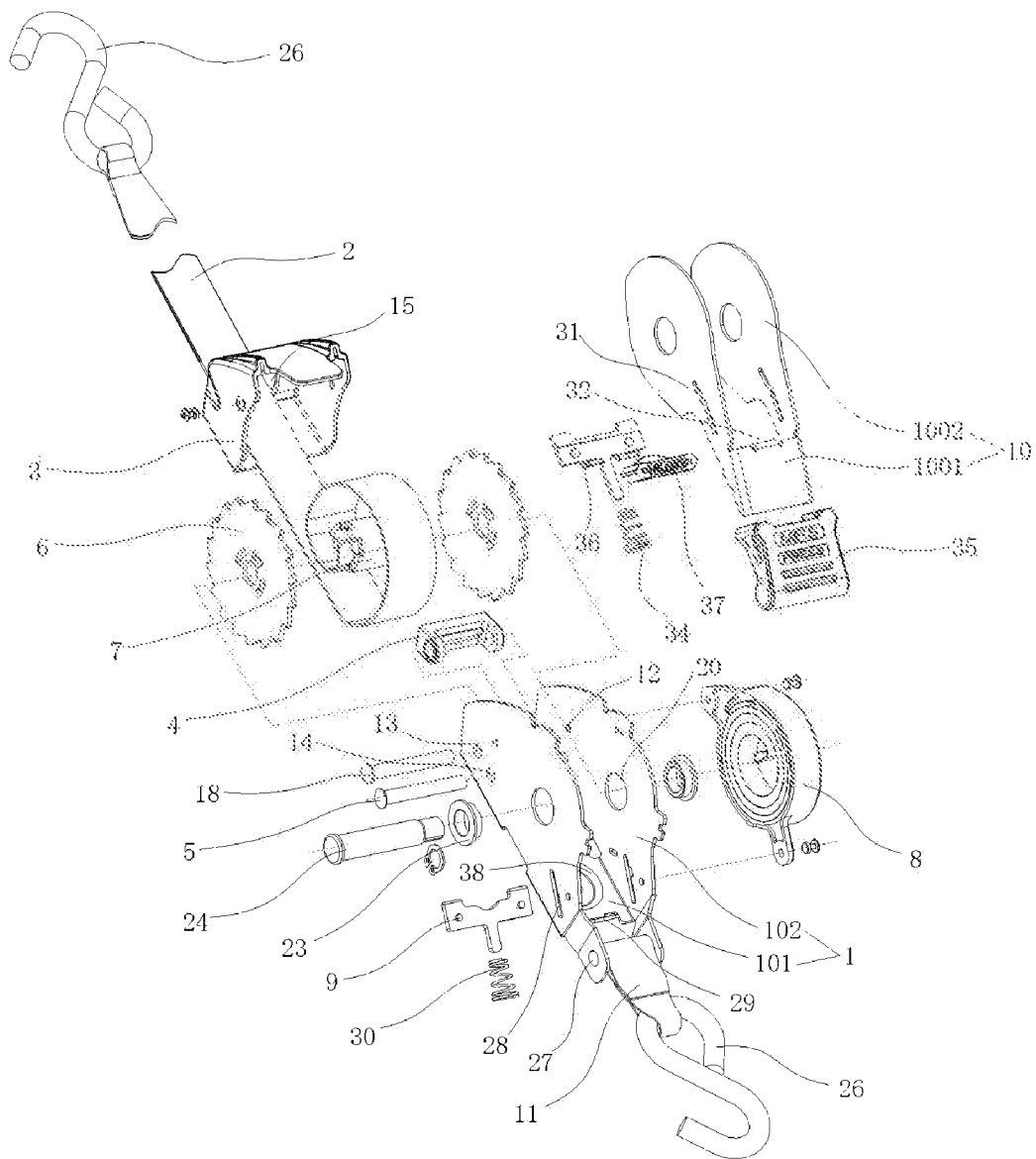
FIG. 2 is an exploded view of the invention.
Figure 3:
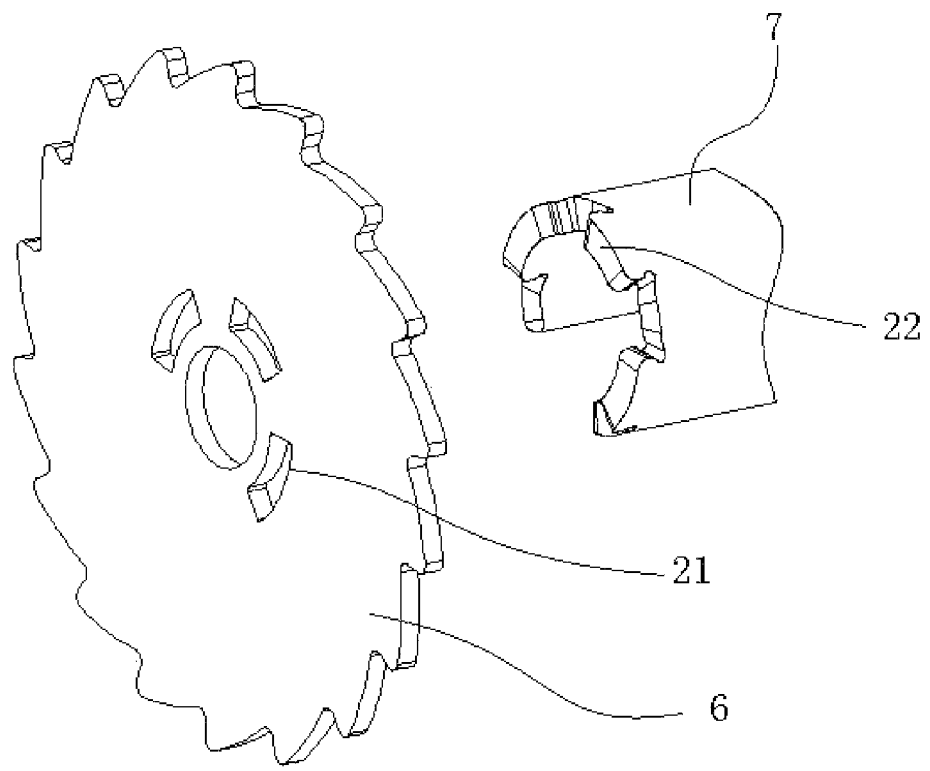
FIG. 3 is a schematic diagram of the ratchet and the connecting sleeve.
Figure 4:
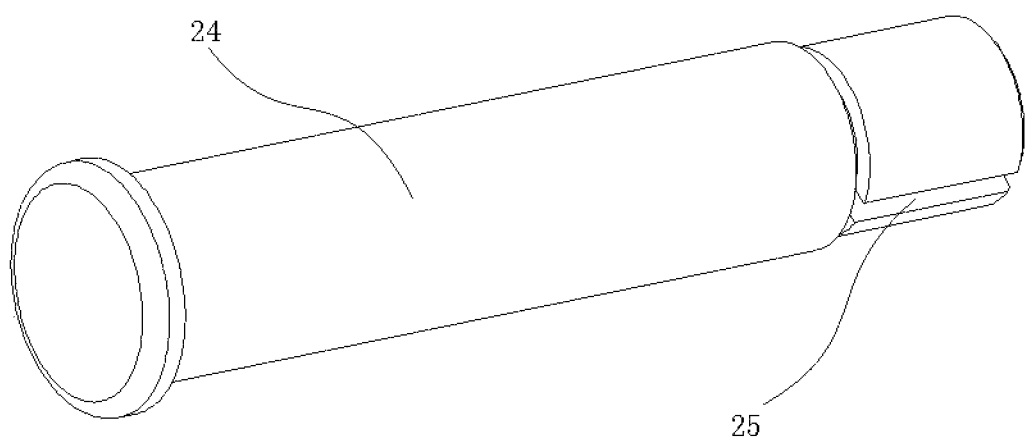
FIG. 4 is a schematic diagram of the ratchet rotating shaft.
Figure 5:
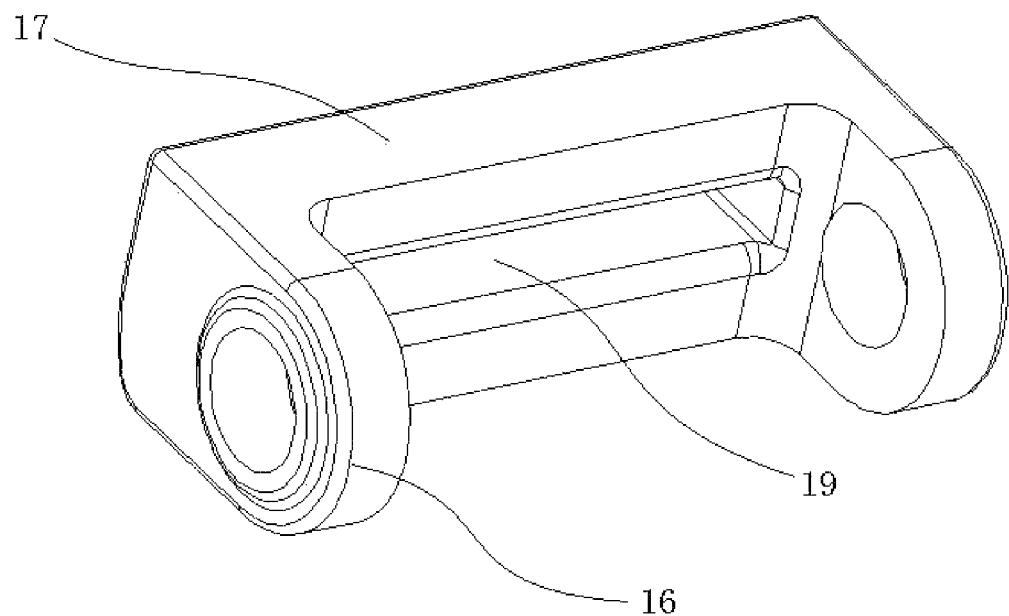
FIG. 5 is a schematic diagram of the movable pendulum block.
Figure 6:
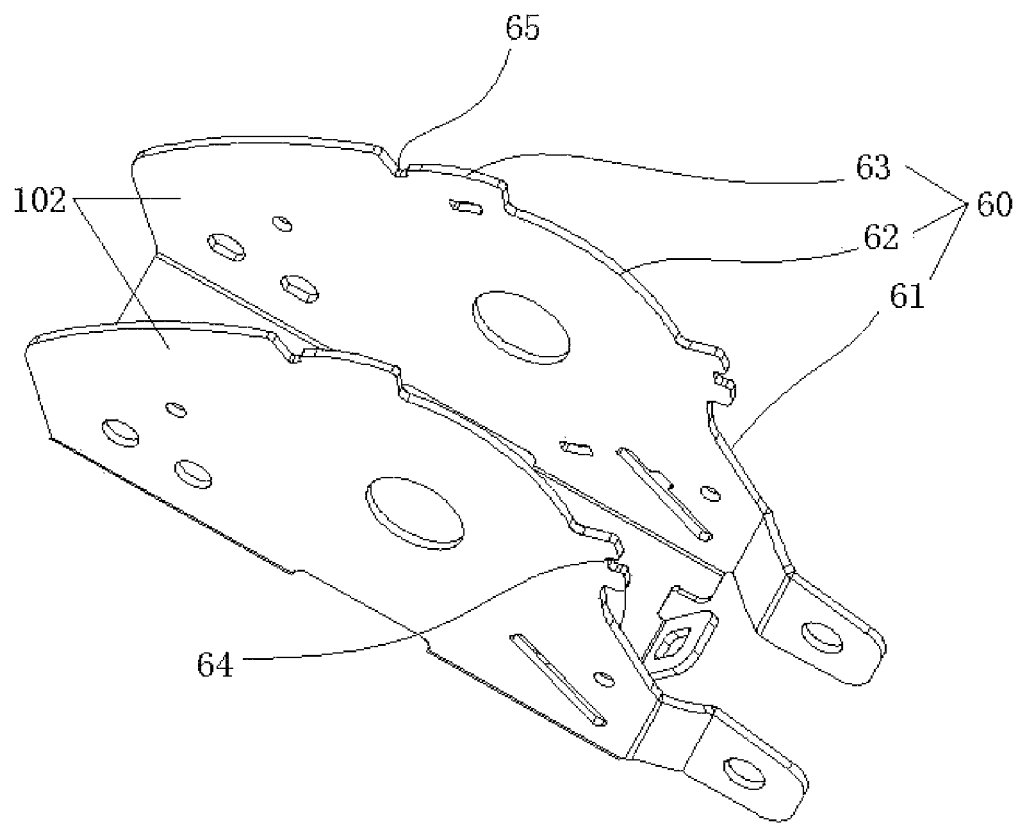
FIG. 6 is a schematic diagram of the base side plate.
Figure 7:
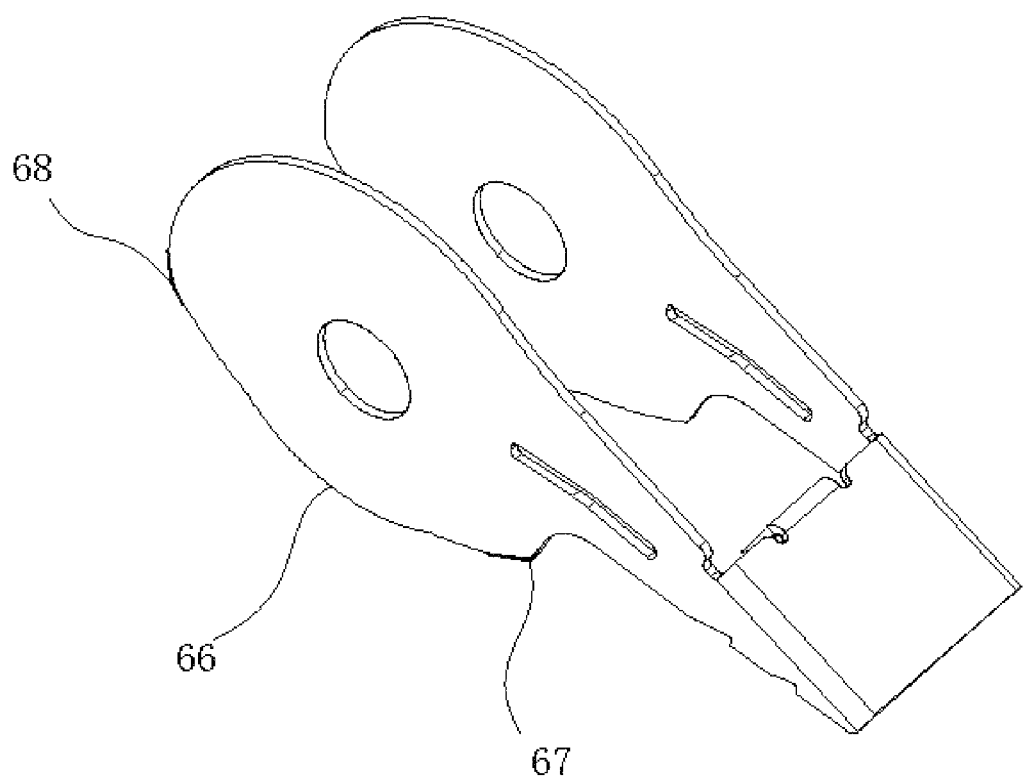
FIG. 7 is a schematic diagram of the handle side plate.

In order to make the technical solutions of the invention clearer, the invention will be further described hereinafter with reference to the embodiments. Any solution obtained by equivalent replacement of the technical features of the technical solution of the invention and conventional reasoning falls into the protection scope of the invention.

Embodiment 1

A safety control take-up fastening appliance of the embodiment, comprising a base 1, wherein the base 1 is composed of a base bottom plate 101 and base side plates 102; the base bottom plate 101 and the base side plates 102 are an integrated structure; the base side plates 102 are perpendicular to the base bottom plate 101 and symmetrically located on both sides of the base bottom plate 101; the front of the base 1 is provided with a long webbing 2, a front cover 3, a movable pendulum block 4 and a guide shaft 5; the middle of the base 1 is provided with ratchets 6, a connecting sleeve 7 and a volute spring 8; the rear of the base 1 is provided with a first pawl 9, a handle 10 and a short webbing 11;

the front side of the base side plate 102 is provided with symmetrical riveting holes 12, pendulum block connecting holes 13 and guide connecting holes 14; the front cover 3 fits with the front of the base 1, is sleeved on the front of the base 1, and is riveted to the base 1 through the riveting holes 12; the front cover 3 is provided with a first through hole 15; the movable pendulum block 4 is composed of connecting plates 16 and a pendulum block 17, and the connecting plates 16 are symmetrically arranged on both sides of the pendulum block 17; the pendulum block connecting hole 13 is provided with a pendulum block rotating shaft 18; the pendulum block rotating shaft 18 is in interference clamping with the pendulum block connecting hole 13, and penetrates the connecting plate 16; the connecting plate 16 is in clearance fit and rotation connection with the pendulum block rotating shaft 18; the pendulum block 17 rotates freely with the pendulum block rotating shaft 18 as the central axis; the pendulum block 17 is provided with a second through hole 19; the guide shaft 5 is placed at the guide connecting hole 14 and is in interference clamping with the guide connecting hole 14;

the middle of the base side plate 102 is provided with symmetrical ratchet connecting holes 20; the number of the ratchets 6 is two, and the middle thereof is provided with a clamping hole 21; the cross section of the connecting sleeve 7 is C-shaped, and both ends thereof are provided with clamping teeth 22; the two ratchets 6 are clamped and connected to the clamping teeth 22 at both ends of the connecting sleeve 7 through the clamping hole 21 to realize the clamping and fixing of the ratchets 6 and the connecting sleeve 7; the ratchet connecting hole 20 is fixedly provided with a shaft sleeve 23, and the rotation of a ratchet rotating shaft 24 and the base side plate 102 is realized through the shaft sleeve 23; the ratchet rotating shaft 24 penetrates the middle of the ratchet 6, passes through the connecting sleeve 7, and is in interference clamping with the connecting sleeve 7; the connecting sleeve 7, the ratchet 6 and the ratchet rotating shaft 24 rotate synchronously; the volute spring 8 is arranged on the outer surface of the base side plate 102; one end of the ratchet rotating shaft 24 is provided with a bayonet 25, which protrudes from the base side plate 102 and extends into the volute spring 8; the ratchet rotating shaft 24 is clamped and connected to the volute spring 8 through the bayonet 25;

one end of the long webbing 2 is sleeved on the ratchet rotating shaft 24, drawn from the C-shaped opening of the connecting sleeve 7 and wound on the connecting sleeve 7, and then passes through the guide shaft 5, the pendulum block rotating shaft 18, the second through hole 19 and the first through hole 15 in sequence; the other end of the long webbing 2 is connected with end fittings 26, which are symmetrically located at the rear ends of the base side plates 101 on both sides of the base bottom plate 102 and are fixedly connected by a connecting rod 27; one end of the short webbing 11 is sleeved on the connecting rod 27, and the other end thereof is connected to the end fitting 26;

the rear side of the base side plate 102 is provided with first pawl sliding grooves 28; the rear side of the base bottom plate 101 is provided with a first limiting plate 29; the first pawl sliding groove 28 is provided with the first pawl 9; the first pawl 9 is T-shaped, and both ends thereof are slidably arranged at the first pawl sliding groove 28, and the lower end thereof is sleeved with a first return spring 30, which is inserted into the first limiting plate 29 and in slidable fit with the first limiting plate 29; under the action of the first return spring 30, the first pawl 9 slides elastically in the direction of the first pawl sliding groove 28; the first pawl 9 is matched with the ratchets 6 correspondingly;

the handle 10 is composed of a handle bottom plate 1001 and handle side plates 1002; the handle bottom plate 1001 and the handle side plates 1002 are an integrated structure; the handle side plates 1002 are perpendicular to the handle bottom plate 1001, and symmetrically located on both sides of the handle bottom plate 1001; the handle side plate 1002 is sleeved on the ratchet rotating shaft 24 and is rotatably connected to the ratchet rotating shaft 24, and freely rotates with the ratchet rotating shaft 24 as the central axis; the handle side plate 1002 is provided with symmetrical second pawl sliding grooves 31; the handle bottom plate 1001 is provided with a second limiting plate 32; the second pawl sliding groove 31 is provided with a second pawl 33; the second pawl 33 is T-shaped, and both ends thereof are slidably arranged at the second pawl sliding groove 31, and the lower end thereof is sleeved with a second return spring 34, which is inserted into the second limiting plate 32, and in slidable fit with the second limiting plate 32; under the action of the second return spring 34, the second pawl 33 slides elastically in the direction of the second pawl sliding groove 28; the second pawl 33 is matched with the ratchets 6 correspondingly;

the two T-shaped ends of the second pawl 33 extend out of the second pawl sliding groove 31, and fit with the upper arc surface 60 of the base side plate 102 under the action of the second return spring 34; the upper arc surface 60 is divided into a no-load section 61, a tightening section 62 and a release section 63 in sequence; a first locking notch 64 is provided between the no-load section 61 and the tightening section 62; a second locking notch 65 is provided at the end of the release section 63;

the lower arc surface 66 of the handle side plate 1002 is provided with a first pressing surface 67 and a second pressing surface 68 for pressing the first pawl 9.

In the embodiment, in order realize article restraint, by rotating the handle, the position of the second pawl on the side arc surface (the no-load section, the first locking notch, the tightening section, the release section and the second locking notch) of the base side plate is adjusted to realize the functional adjustment of the fastening appliance;

when the second pawl is in the no-load section, the handle can be pressed down. When the handle is turned and pressed down, the second pawl moves down along the no-load section. At this time, the distance between the second pawl and the ratchet rotating axis increases, and the second pawl separates from the ratchet; at the same time, the first pressing surface squeezes the first pawl to increase the distance between the first pawl and the ratchet rotating axis, and the first pawl separates from the ratchet. At this time, under the action of the volute spring, the ratchet rotating shaft, the connecting sleeve and the ratchet rotate to drive the rewinding of the long webbing. In this state, the long webbing can also be manually stretched, but it's more laborious because you need to keep pressing down on the handle. Otherwise, under the action of the first return spring and the second return spring, the first pawl and the second pawl respectively force the handle to reset upwards, so that the first pawl and the second pawl will mesh with the ratchet again;

when the second pawl is located at the first locking notch, the second pawl engages with the first locking notch; at this time, the handle cannot be rotated to prevent misoperation; the second pawl is disengaged from the ratchet, the first pawl engages with the ratchet, the ratchet cannot be rotated, and the fastening appliance is in a safe locked state;

when the second pawl is in the tightening section, at this time, the first pawl and the second pawl are both engaged with the ratchet, and the second pawl does not contact the tightening section (to ensure the meshing effect of the second pawl and the ratchet, and to prevent the second pawl from rubbing against the tightening section, resulting in an increase in the rotation resistance when rotating the handle); turn the handle counterclockwise, the second pawl moves along the tightening section to drive the ratchet to rotate, and the first pawl slides along the outer edge of the ratchet. When the handle is rotated to the limit position of the tightening section, the handle can be rotated clockwise, the second pawl slides along the outer edge of the ratchet, the first pawl meshes with the ratchet, and the handle is reset. Repeating the counterclockwise and clockwise rotation of the handle can manually wind up the long webbing, which is also used to increase the tension of the long webbing to tighten it;

when the second pawl is in the release section, the second pawl is disengaged from the ratchet, and the handle is rotated counterclockwise until the second pawl engages with the second locking notch; at this time, the second pressing surface squeezes the first pawl to separate the first pawl from the ratchet, and the long webbing is automatically wound up under the action of the volute spring.

Embodiment 2

As shown in FIG. 8-11, the safety control take-up fastening appliance of the embodiment, wherein after one end of the long webbing 2 sleeved on the ratchet rotating shaft 24 is drawn from the C-shaped opening of the connecting sleeve 7 and wound on the connecting sleeve 7, it first passes between the guide shaft 5 and the base bottom plate 101, and passes between the pendulum block rotating shaft 18 and the base bottom plate 101, then passes through the second through hole 19, and finally passes through the first through hole 15.

Figure 8:
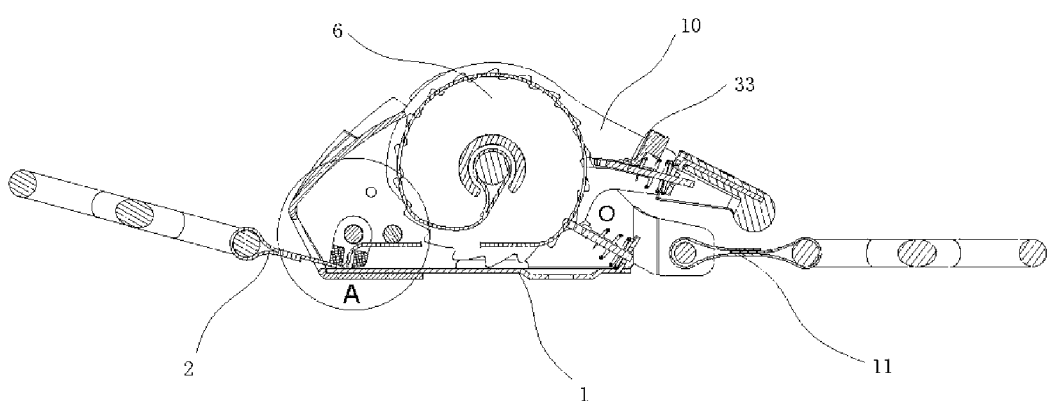
FIG. 8 is a cross-sectional view of the invention in Embodiment 2 (the long webbing is pressed and stopped).
Figure 9:
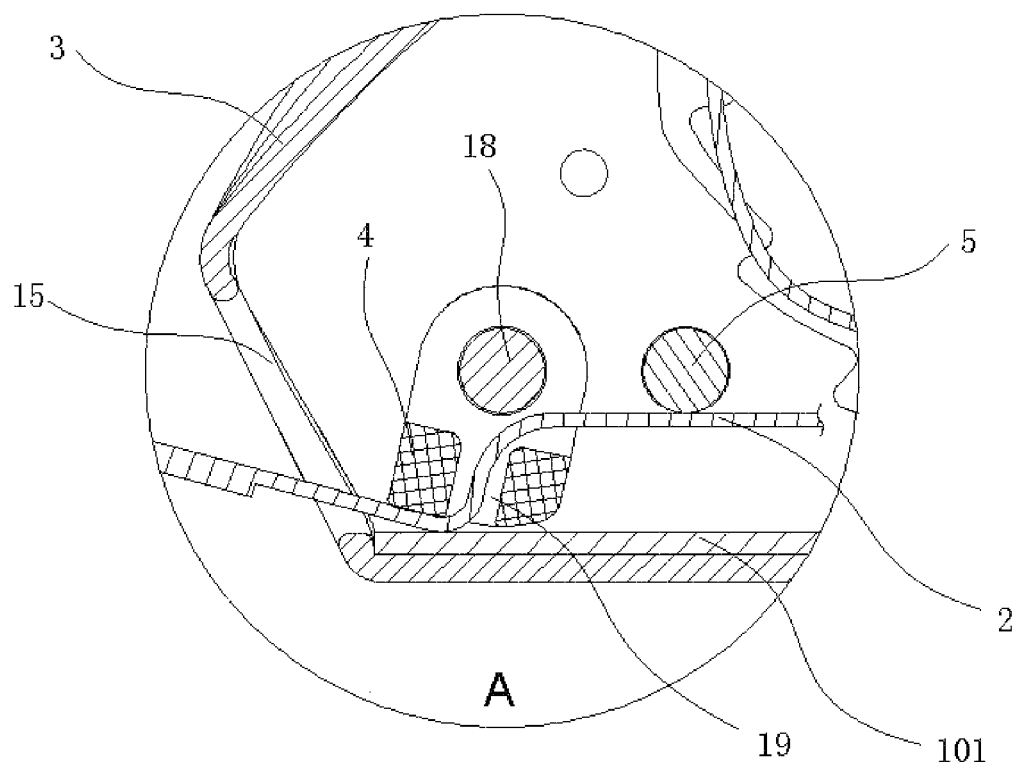
FIG. 9 is an enlarged view of area A in FIG. 8.
Figure 10:
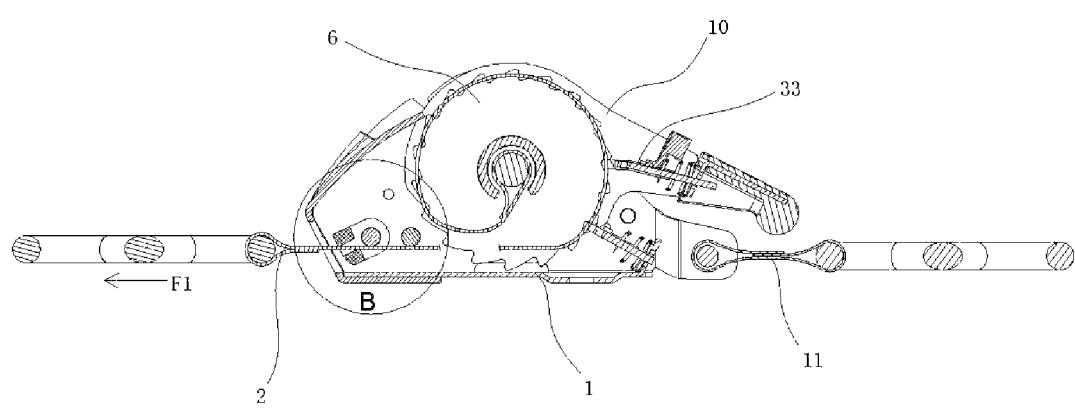
FIG. 10 is a cross-sectional view of the invention in Embodiment 2 (the long webbing is not pressed and stopped).
Figure 11:
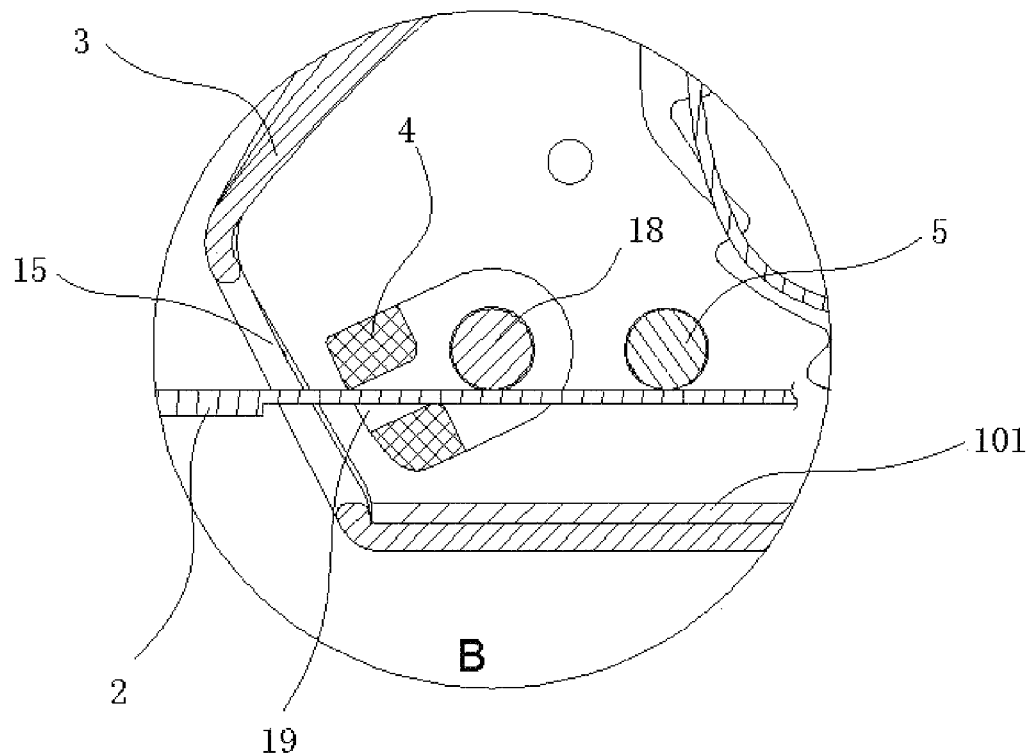
FIG. 11 is an enlarged view of area B in FIG. 10.

In the embodiment, a winding method of the long webbing is provided. The long webbing wound by this method is a semi-automatic winding when retracting and winding. The specific principle is as follows:

keep the first pawl and the second pawl separated from the ratchet. When the long webbing retracts by itself under the tension of the volute spring, as shown in FIGS. 8 and 9, the movable pendulum block is driven by the long webbing and rotates counterclockwise until the long webbing is firmly pressed between the movable pendulum block and the base bottom plate, so that the long webbing stops retracting and winding, that is, the long webbing cannot retract and rewind for a long time;

However, when the long webbing is given a pulling force F1 that is opposite to the retracting direction (as shown in FIG. 10), the long webbing is pulled straight, and the movable pendulum block cannot approach the base bottom plate; at this time, adjust the size of F1 so that F1 is less than the traction force of pulling the long webbing to retract, that is, the long webbing can be retracted and wound continuously.

the winding structure of the long webbing of the embodiment realizes the function of the fastening appliance to wind the long webbing semi-automatically, which can effectively prevent the rapid retraction of the long webbing from causing accidental injury to surrounding personnel or objects, and has the function of safety control.

Embodiment 3

Figure 12:
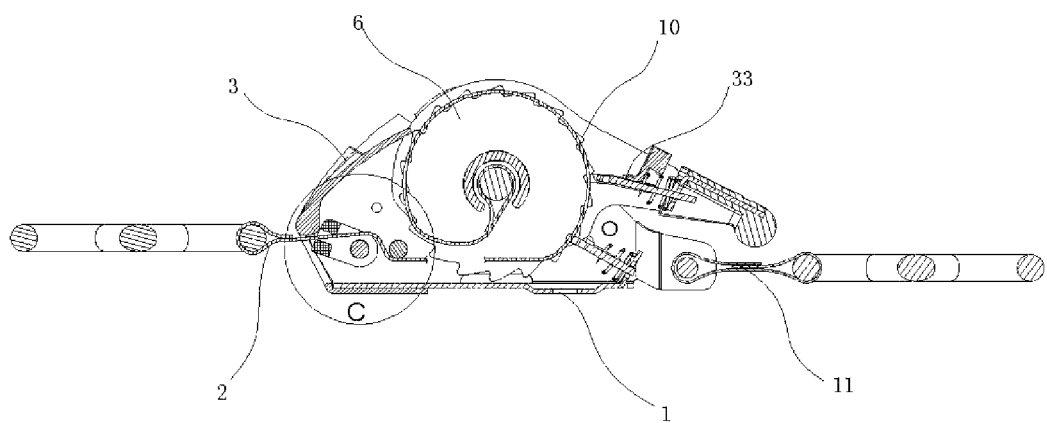
FIG. 12 is a cross-sectional view of the invention in Embodiment 3 (the long webbing is not pressed and stopped).
Figure 13:
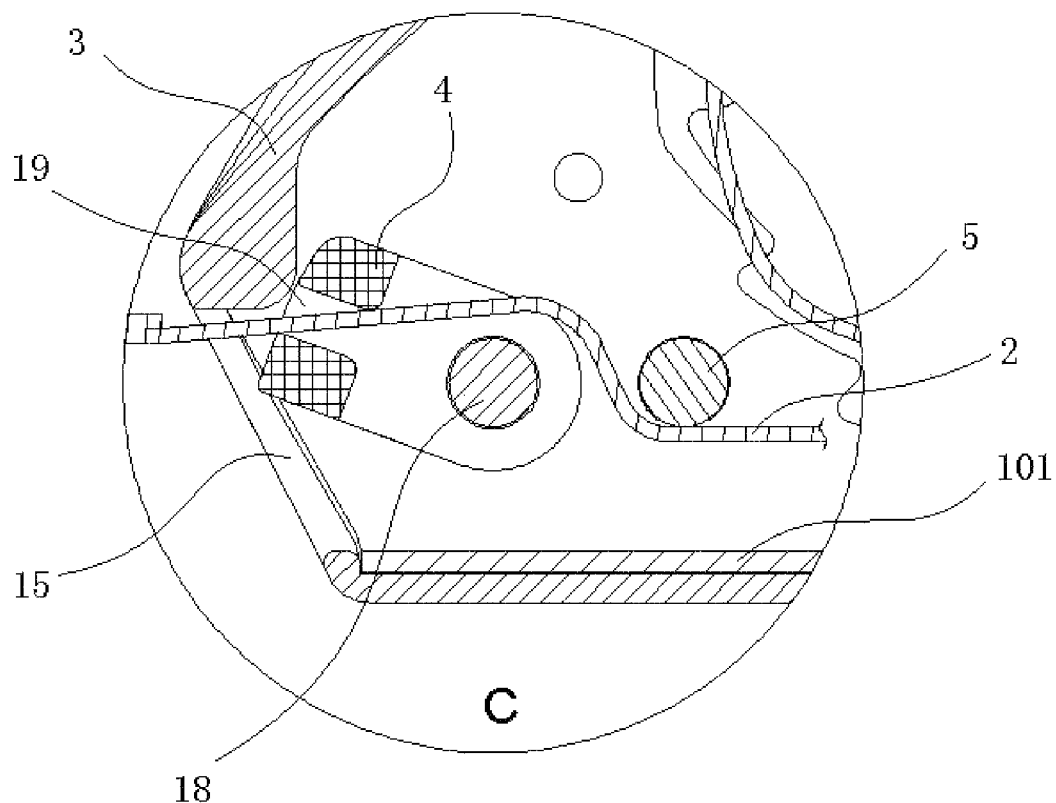
FIG. 13 is an enlarged view of area C in FIG. 12.

As shown in FIG. 12-13, the safety control take-up fastening appliance of the embodiment, wherein after one end of the long webbing 2 sleeved on the ratchet rotating shaft 24 is drawn from the C-shaped opening of the connecting sleeve 7 and wound on the connecting sleeve 7, it first passes between the guide shaft 5 and the base bottom plate 101, and bypasses the side of the pendulum block rotating shaft 18 away from the base bottom plate 101, then passes through the second through hole 19, and finally passes through the first through hole 15.

In the embodiment, a winding method of the long webbing is provided. The long webbing wound by this method is an automatic winding when retracting and winding. The specific principle is as follows:

keep the first pawl and the second pawl separated from the ratchet. When the long webbing retracts by itself under the tension of the volute spring, the movable pendulum block is driven by the long webbing and rotates clockwise until the long webbing is pressed by the movable pendulum block on the upper lip of the first through hole, but it will not be completely compressed. When the long webbing stops winding, the long webbing and the movable pendulum block are separated from the first through hole under the action of their own weight, and then the long webbing continues to be wound until it is compressed again. Repeated detaching and pressing actions, the long webbing is continuously and intermittently wound up;

the winding structure of the long webbing in the embodiment realizes the function of the fastening appliance to wind up the long webbing semi-automatically. The continuous and intermittent rewinding of the long webbing can effectively maintain the rewinding speed of the long webbing, which can effectively prevent the rapid retraction of the long webbing from causing accidental injury to the surrounding personnel or objects, and has the function of safety control;

compared with the Embodiment, the embodiment does not need to apply the pulling force F1.

Embodiment 4

The safety control take-up fastening appliance of the embodiment, wherein the handle bottom plate 1001 is sleeved with a handle sleeve 35; the second pawl 33 extends with a control board 36 for dialing the second pawl 33; the outside of the control board 36 is sleeved with a control sleeve 37. Both the handle sleeve 35 and the control sleeve 37 are provided with anti-skid patterns. The end fittings 26 are connectors for connection, including but not limited to hooks and locks.

In the embodiment, the handle sleeve is used to control the handle, the control sleeve is used to control the expansion and contraction of the second pawl to facilitate the adjustment of the handle and the second pawl, and the end fittings are used to fasten the end connection of the long and short webbings on the appliance.

Embodiment 5

The safety control take-up fastening appliance of the embodiment, wherein the base bottom plate 101 is provided with an appliance connecting hole 38.

Figure 14:
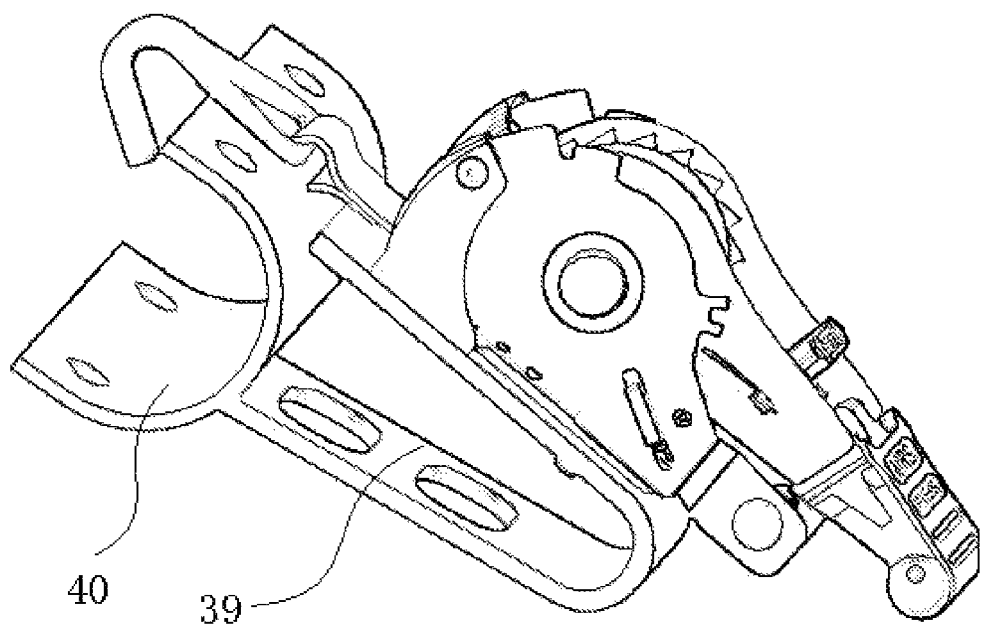
FIG. 14 is a schematic diagram of a circular tube connector.
Figure 15:
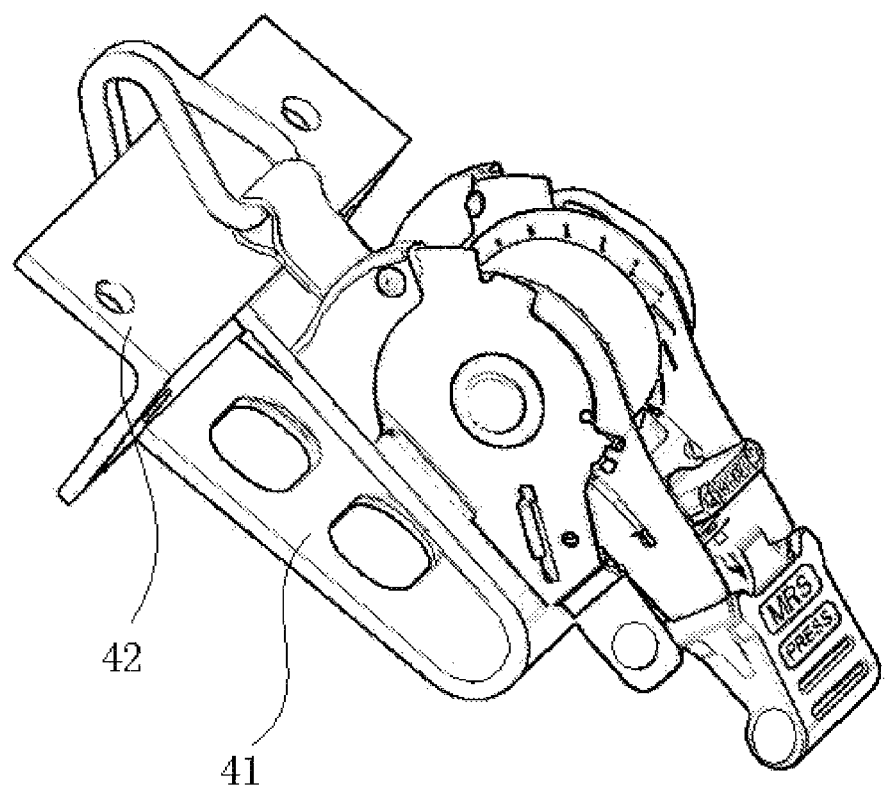
FIG. 15 is a schematic diagram of a square tube connector.

The fastening appliance of the embodiment can be fixed on the plate by riveting between the connecting holes 38; at the same time, the fastening appliance can be fixed on the connector through the connecting holes;

As shown in FIG. 14, the fastening appliance is connected to a circular tube connector 39 through the connecting holes 38. The circular tube connector 39 comprises an arc-shaped connecting plate 40 conforming to the shape of the circular tube, and the arc-shaped connecting plate 40 is provided with screw holes for riveting;

As shown in FIG. 15, the fastening appliance is connected to a square tube connector 41 through the connecting holes 38. The square tube connector 41 comprises an right-angle connecting plate 42 conforming to the shape of the circular tube, and the right-angle connecting plate 42 is provided with screw holes for riveting;

Embodiment 6

The safety control take-up fastening appliance of the embodiment, wherein the base side plate 102 is provided with a brake component 43; the brake component 43 is located on the opposite side of the volute spring 8 and comprises an adjusting cap 44, a pressure spring 45 and a brake disc 46; the adjusting cap 44 is connected to the base side plate 102 through screw threads, and is covered on one end of the ratchet rotating shaft 24; the pressure spring 45 and the brake disc 46 are arranged between the adjusting cap 44 and the ratchet rotating shaft 24, and the brake disc 46 is closely attached to one end of the ratchet rotating shaft 24; the two ends of the pressure spring 45 are respectively pressed against the adjusting cap 44 and the brake disc 46; the pressure spring 45 is always in a compressed state.

Figure 16:
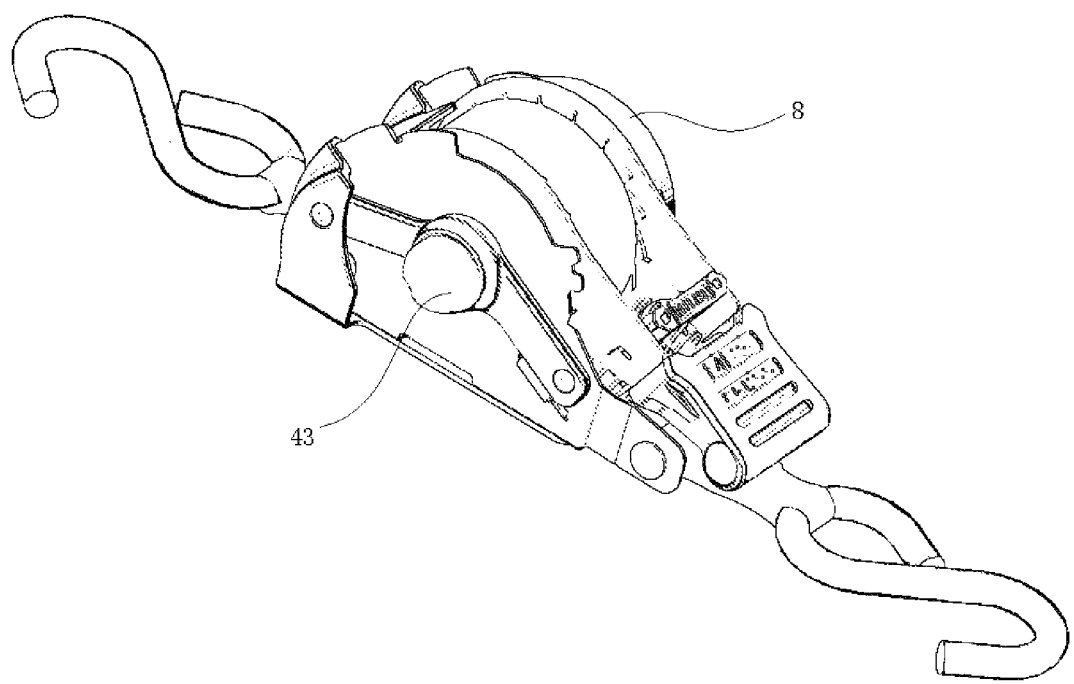
FIG. 16 is a schematic diagram of the invention (with the brake component).
Figure 17:
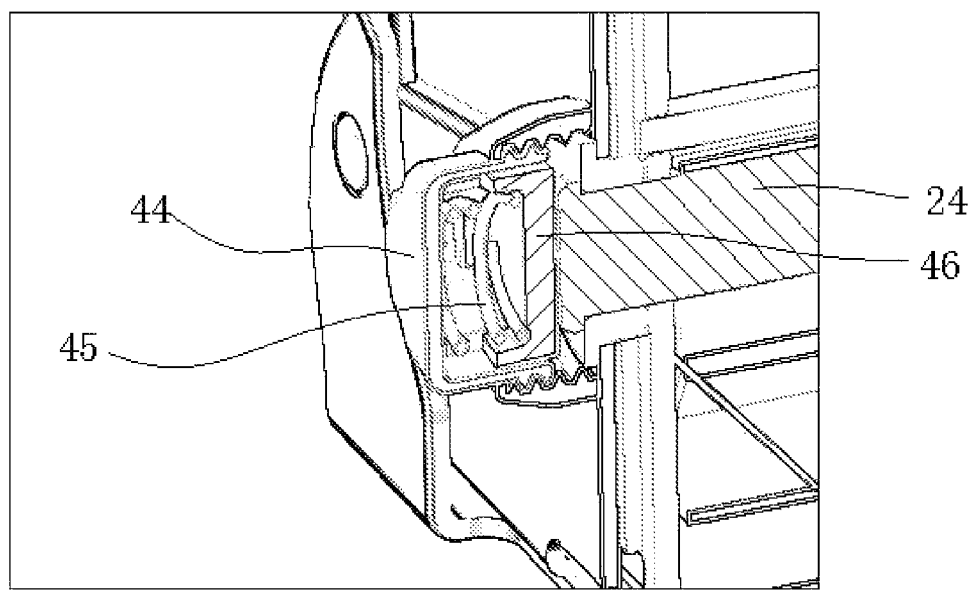
FIG. 17 is a cross-sectional view of the brake component.

In the embodiment, as shown in FIGS. 16 and 17, the brake component can continuously squeeze the ratchet rotating shaft. When the ratchet rotating shaft rotates to rewind the long webbing, the brake disc rubs against the rotating ratchet shaft to reduce the speed of the ratchet rotating shaft, thereby controlling the winding speed of the long webbing, and effectively preventing the rapid retraction of the long webbing from causing accidental injury to surrounding personnel and objects. At the same time, by rotating the adjusting cap, the friction strength between the brake disc and the rotating ratchet shaft can be adjusted, thereby adjusting the winding speed of the long webbing;

The brake component of the embodiment can directly replace the movable pendulum block in the above embodiment, and at the same time, it can also be used in conjunction with the movable pendulum block.

Based on the above embodiments, the invention can be used in many types of logistics fields, such as aerospace, freight, shipping, etc., and its function is to provide restraints for goods or cargos to ensure stable transportation, and has stable structure and convenient operation. According to the winding structure of the webbing, it can be divided into automatic winding and semi-automatic winding. The safety is far higher than that of the old-fashioned fastening appliance, which can effectively prevent the rapid retraction of the webbing from causing accidental injury to surrounding personnel or objects, and play a safe control function. At the same time, the connector can be loaded through the appliance connecting hole for easy installation and use.

The above are only the preferred specific embodiments of the invention, but the protection scope of the invention is not limited thereto. Any changes or replacements that can be easily conceived by those skilled in the art within the technical scope disclosed by the invention shall all fall within the protection scope of the invention. Therefore, the protection scope of the invention should be subject to the protection scope of the claims.

The invention claimed is:

1. A safety control take-up fastening appliance, comprising a base, wherein the base is composed of a base bottom plate and base side plates; the base bottom plate and the base side plates are an integrated structure; the base side plates are perpendicular to the base bottom plate and symmetrically located on both sides of the base bottom plate; the front of the base is provided with a long webbing, a front cover, a movable pendulum block and a guide shaft; the middle of the base is provided with ratchets, a connecting sleeve and a volute spring; the rear of the base is provided with a first pawl, a handle and a short webbing;

the front side of the base side plate is provided with symmetrical riveting holes, pendulum block connecting holes and guide connecting holes; the front cover fits with the front of the base, is sleeved on the front of the base, and is riveted to the base through the riveting holes; the front cover is provided with a first through hole; the movable pendulum block is composed of connecting plates and a pendulum block, and the connecting plates are symmetrically arranged on both sides of the pendulum block; the pendulum block connecting hole is provided with a pendulum block rotating shaft; the pendulum block rotating shaft is in interference clamping with the pendulum block connecting hole, and penetrates the connecting plate; the connecting plate is in clearance fit and rotational connection with the pendulum block rotating shaft; the pendulum block rotates freely with the pendulum block rotating shaft as the central axis; the pendulum block is provided with a second through hole; the guide shaft is placed at the guide connecting hole and is in interference clamping with the guide connecting hole;

the middle of the base side plate is provided with symmetrical ratchet connecting holes; the number of the ratchets is two, and the middle thereof is provided with a clamping hole; the cross section of the connecting sleeve is C-shaped, and both ends thereof are provided with clamping teeth; the two ratchets are clamped and connected to the clamping teeth at both ends of the connecting sleeve through the clamping hole to realize the clamping and fixing of the ratchets and the connecting sleeve; the ratchet connecting hole is fixedly provided with a shaft sleeve, and the rotation of a ratchet rotating shaft and the base side plate is realized through the shaft sleeve; the ratchet rotating shaft penetrates the middle of the ratchet, passes through the connecting sleeve, and is in interference clamping with the connecting sleeve; the connecting sleeve, the ratchet and the ratchet rotating shaft rotate synchronously; the volute spring is arranged on the outer surface of the base side plate; one end of the ratchet rotating shaft is provided with a bayonet, which protrudes from the base side plate and extends into the volute spring; the ratchet rotating shaft is clamped and connected to the volute spring through the bayonet;

one end of the long webbing is sleeved on the ratchet rotating shaft, drawn from the C-shaped opening of the connecting sleeve and wound on the connecting sleeve, and then passes through the guide shaft, the pendulum block rotating shaft, the second through hole and the first through hole in sequence; the other end of the long webbing is connected with end fittings, which are symmetrically located at the rear ends of the base side plates on both sides of the base bottom plate and are fixedly connected by a connecting rod; one end of the short webbing is sleeved on the connecting rod, and the other end thereof is connected to the end fitting;

the rear side of the base side plate is provided with first pawl sliding grooves; the rear side of the base bottom plate is provided with a first limiting plate; the first pawl sliding groove is provided with the first pawl; the first pawl is T-shaped, and both ends thereof are slidably arranged at the first pawl sliding groove, and the lower end thereof is sleeved with a first return spring, which is inserted into the first limiting plate and in slidable fit with the first limiting plate; under the action of the first return spring, the first pawl slides elastically in the direction of the first pawl sliding groove; the first pawl is matched with the ratchets correspondingly;

the handle is composed of a handle bottom plate and handle side plates; the handle bottom plate and the handle side plates are an integrated structure; the handle side plates are perpendicular to the handle bottom plate, and symmetrically located on both sides of the handle bottom plate; the handle side plate is sleeved on the ratchet rotating shaft and is rotatably connected to the ratchet rotating shaft, and freely rotates with the ratchet rotating shaft as the central axis; the handle side plate is provided with symmetrical second pawl sliding grooves; the handle bottom plate is provided with a second limiting plate; the second pawl sliding groove is provided with the second pawl; the second pawl is T-shaped, and both ends thereof are slidably arranged at the second pawl sliding groove, and the lower end thereof is sleeved with a second return spring, which is inserted into the second limiting plate, and in slidable fit with the second limiting plate; under the action of the second return spring, the second pawl slides elastically in the direction of the second pawl sliding groove; the second pawl is matched with the ratchets correspondingly.

2. The safety control take-up fastening appliance according to claim 1, wherein the two T-shaped ends of the second pawl extend out of the second pawl sliding groove, and fit with the upper arc surface of the base side plate under the action of the second return spring; the upper arc surface is divided into a no-load section, a tightening section and a release section in sequence; a first locking notch is provided between the no-load section and the tightening section; a second locking notch is provided at the end of the release section;

the lower arc surface of the handle side plate is provided with a first pressing surface and a second pressing surface for pressing the first pawl.

3. The safety control take-up fastening appliance according to claim 2, wherein after one end of the long webbing sleeved on the ratchet rotating shaft is drawn from the C-shaped opening of the connecting sleeve and wound on the connecting sleeve, it first passes between the guide shaft and the base bottom plate, and passes between the pendulum block rotating shaft and the base bottom plate, then passes through the second through hole, and finally passes through the first through hole.

4. The safety control take-up fastening appliance according to claim 2, wherein after one end of the long webbing sleeved on the ratchet rotating shaft is drawn from the C-shaped opening of the connecting sleeve and wound on the connecting sleeve, it first passes between the guide shaft and the base bottom plate, and bypasses the side of the pendulum block rotating shaft away from the base bottom plate, then passes through the second through hole, and finally passes through the first through hole.

5. The safety control take-up fastening appliance according to claim 3 or 4, wherein the handle bottom plate is sleeved with a handle sleeve; the second pawl extends with a control board for dialing the second pawl; the outside of the control board is sleeved with a control sleeve.

6. The safety control take-up fastening appliance according to claim 5, wherein both the handle sleeve and the control sleeve are provided with anti-skid patterns.

7. The safety control take-up fastening appliance according to claim 6, wherein the end fittings are connectors for connection, wherein the connectors are hooks and locks.

8. The safety control take-up fastening appliance according to claim 6 or 7, wherein the base bottom plate is provided with an appliance connecting hole.

9. The safety control take-up fastening appliance according to claim 8, wherein the base side plate is provided with a brake component; the brake component is located on the opposite side of the volute spring and comprises an adjusting cap, a pressure spring and a brake disc; the adjusting cap is connected to the base side plate through screw threads, and is covered on one end of the ratchet rotating shaft; the pressure spring and the brake disc are arranged between the adjusting cap and the ratchet rotating shaft, and the brake disc is closely attached to one end of the ratchet rotating shaft; the two ends of the pressure spring are respectively pressed against the adjusting cap and the brake disc.

10. The safety control take-up fastening appliance according to claim 9, wherein the pressure spring is always in a compressed state.

* * * * *